United States Patent
Kobara et al.

(10) Patent No.: US 10,634,075 B2
(45) Date of Patent: Apr. 28, 2020

(54) EXHAUST GAS RECIRCULATION CONTROL METHOD AND EXHAUST GAS RECIRCULATION CONTROL DEVICE

(71) Applicant: NISSAN MOTOR CO., LTD., Yokohama-shi, Kanagawa (JP)

(72) Inventors: Tetsuya Kobara, Kanagawa (JP); Takayuki Hamamoto, Kanagawa (JP); Kazuhiro Terayama, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 148 days.

(21) Appl. No.: 15/757,557

(22) PCT Filed: Sep. 7, 2015

(86) PCT No.: PCT/JP2015/075352
§ 371 (c)(1),
(2) Date: Mar. 5, 2018

(87) PCT Pub. No.: WO2017/042868
PCT Pub. Date: Mar. 16, 2017

(65) Prior Publication Data
US 2018/0245528 A1    Aug. 30, 2018

(51) Int. Cl.
*F02D 41/00* (2006.01)
*F02M 26/06* (2016.01)
(Continued)

(52) U.S. Cl.
CPC .......... *F02D 41/0052* (2013.01); *F02B 37/18* (2013.01); *F02D 21/08* (2013.01);
(Continued)

(58) Field of Classification Search
CPC .......... F02B 37/04; F02B 37/18; F02D 21/08; F02D 23/02; F02D 41/0007;
(Continued)

(56) References Cited

U.S. PATENT DOCUMENTS

| 2014/0060043 | A1 | 3/2014 | Miyashita |
| 2014/0261312 | A1 | 9/2014 | Ueno et al. |
| 2015/0113985 | A1* | 4/2015 | Kawaguchi ........... F01N 3/2013 60/605.2 |

FOREIGN PATENT DOCUMENTS

| DE | 10 2014 101336 A1 | 8/2014 |
| EP | 2 317 111 A1 | 5/2011 |

(Continued)

*Primary Examiner* — Thai Ba Trieu
*Assistant Examiner* — Dapinder Singh
(74) *Attorney, Agent, or Firm* — Foley & Lardner LLP (57) ABSTRACT

An exhaust gas recirculation control method of an internal combustion engine, the internal combustion engine including: a turbo supercharger; an exhaust gas recirculation passage communicating an exhaust passage with an intake passage at a part upstream of a compressor of the turbo supercharger; an exhaust gas recirculating amount control valve disposed in the exhaust gas recirculation passage; a differential pressure generating valve disposed upstream of a merging portion of fresh air gas and exhaust gas in the intake passage; and a controller adapted to control an opening of the exhaust gas recirculation amount control valve and an opening of the differential pressure generating valve, wherein in the method, the controller cooperatively controls the opening of the exhaust gas recirculation amount control valve and the opening of the differential pressure generating valve to make an exhaust gas recirculation ratio change to a target exhaust gas recirculation ratio at a change rate that prevents abnormal combustion of the internal combustion engine.

9 Claims, 11 Drawing Sheets

(51) Int. Cl.
  *F02D 21/08* (2006.01)
  *F02D 23/02* (2006.01)
  *F02M 26/64* (2016.01)
  *F02M 26/10* (2016.01)
  *F02D 41/24* (2006.01)
  *F02B 37/18* (2006.01)
  *F02D 41/14* (2006.01)

(52) U.S. Cl.
  CPC ......... *F02D 23/02* (2013.01); *F02D 41/0007* (2013.01); *F02D 41/0072* (2013.01); *F02D 41/0077* (2013.01); *F02D 41/2422* (2013.01); *F02M 26/06* (2016.02); *F02M 26/10* (2016.02); *F02M 26/64* (2016.02); *F02D 2041/0017* (2013.01); *F02D 2041/1419* (2013.01); *Y02T 10/144* (2013.01); *Y02T 10/47* (2013.01)

(58) Field of Classification Search
  CPC ............. F02D 41/0052; F02D 41/0072; F02D 41/0077; F02D 41/2422; F02D 41/26; F02D 2041/0017; F02D 2041/1419; F02M 26/03; F02M 26/04; F02M 26/06; F02M 26/10; F02M 26/64; Y02T 10/144; Y02T 10/47
  USPC .............................................. 60/602, 605.2
  See application file for complete search history.

(56) References Cited

FOREIGN PATENT DOCUMENTS

| | | |
|---|---|---|
| EP | 2 696 059 A1 | 2/2014 |
| JP | 3-888024 B2 | 2/2007 |
| JP | 2012-7547 A | 1/2012 |
| JP | 2013-177839 A | 9/2013 |
| WO | WO 2012/157108 A1 | 11/2012 |
| WO | WO 2013/109249 A1 | 7/2013 |
| WO | WO 2014/150810 A1 | 9/2014 |

* cited by examiner

EXHAUST GAS RECIRCULATION CONTROL METHOD AND EXHAUST GAS RECIRCULATION CONTROL DEVICE

TECHNICAL FIELD

The present invention relates to exhaust gas recirculation control of an internal combustion engine that includes a turbo supercharger and an exhaust gas recirculation system.

BACKGROUND ART

An exhaust gas recirculation (EGR: Exhaust Gas Recirculation) device is known, which causes a part of exhaust gas to recirculate into an intake passage, in order to prevent knocking and to achieve effects such as improvement in fuel economy due to reduction in pumping loss. Furthermore, JP2012-7547A discloses a low-pressure loop EGR device as an EGR device applied to internal combustion engines with turbo superchargers, which device causes a part of exhaust gas (hereinafter, also referred to as EGR gas) to recirculate into the intake passage at a part upstream of a compressor of the turbo supercharger.

This low-pressure loop EGR device includes a differential pressure generating valve for ensuring a differential pressure between the intake passage and an exhaust passage even in operating regions with low intake amounts. Furthermore, in the operating regions with low intake amounts, opening and closing of the EGR valve to adjust the amount of EGR gas is controlled in a state in which the differential pressure generating valve is controlled to a closing side. That is to say, the differential pressure is generated at the differential pressure generating valve, and the amount of EGR gas is adjusted by the EGR valve. Moreover, in the above document, an operated order of the differential pressure generating valve and the EGR valve are determined for the controlling, in a case in which the EGR ratio is to be changed equal to or more than a predetermined changing amount.

SUMMARY OF INVENTION

When the EGR ratio changes, ignition timing thereof will also change in accordance with the EGR ratio. The ignition timing in this case is typically changed at a constant change rate, assuming that the EGR ratio will change from a current EGR ratio to a new target EGR ratio at a constant change rate.

However, if the differential pressure generating valve and the EGR valve are manipulated to open and close separately as in the above document, it is impossible to avoid a sudden change in the EGR ratio. For example, when the EGR ratio is reduced, in the above-mentioned document, the EGR valve is controlled in the closing direction after the differential pressure generating valve is fully opened. According to this, the EGR ratio drops sharply when the differential pressure generating valve is made fully open. On the other hand, when the EGR ratio is increased, the above document controls the EGR valve to an opening in accordance with a target EGR ratio upon controlling the differential pressure generating valve in the closing direction. According to this, the EGR ratio increases sharply when the differential pressure generating valve is controlled in the closing direction.

In contrast to the ignition timing changing at a constant change rate as described above, when the EGR ratio changes sharply, the ignition timing would not be an appropriate timing for the actual EGR ratio, and may cause deterioration in combustion stability.

Accordingly, an object of the present invention is to change the EGR ratio without causing any deterioration in the combustion stability.

According to one embodiment of this invention, an exhaust gas recirculation control method of an internal combustion engine, the internal combustion engine comprising: a turbo supercharger; an exhaust gas recirculation passage communicating an exhaust passage with an intake passage at a part upstream of a compressor of the turbo supercharger; an exhaust gas recirculating amount control valve disposed in the exhaust gas recirculation passage; a differential pressure generating valve disposed upstream of a merging portion of fresh air gas and exhaust gas in the intake passage; and a controller adapted to control an opening of the exhaust gas recirculation amount control valve and an opening of the differential pressure generating valve is provided. In the method, the controller cooperatively controls the opening of the exhaust gas recirculation amount control valve and the opening of the differential pressure generating valve to make an exhaust gas recirculation ratio change to a target exhaust gas recirculation ratio at a change rate that prevents abnormal combustion of the internal combustion engine.

DESCRIPTION OF EMBODIMENTS

The following describes embodiments of the present invention, with reference to the attached drawings.

First Embodiment

Figure 1:
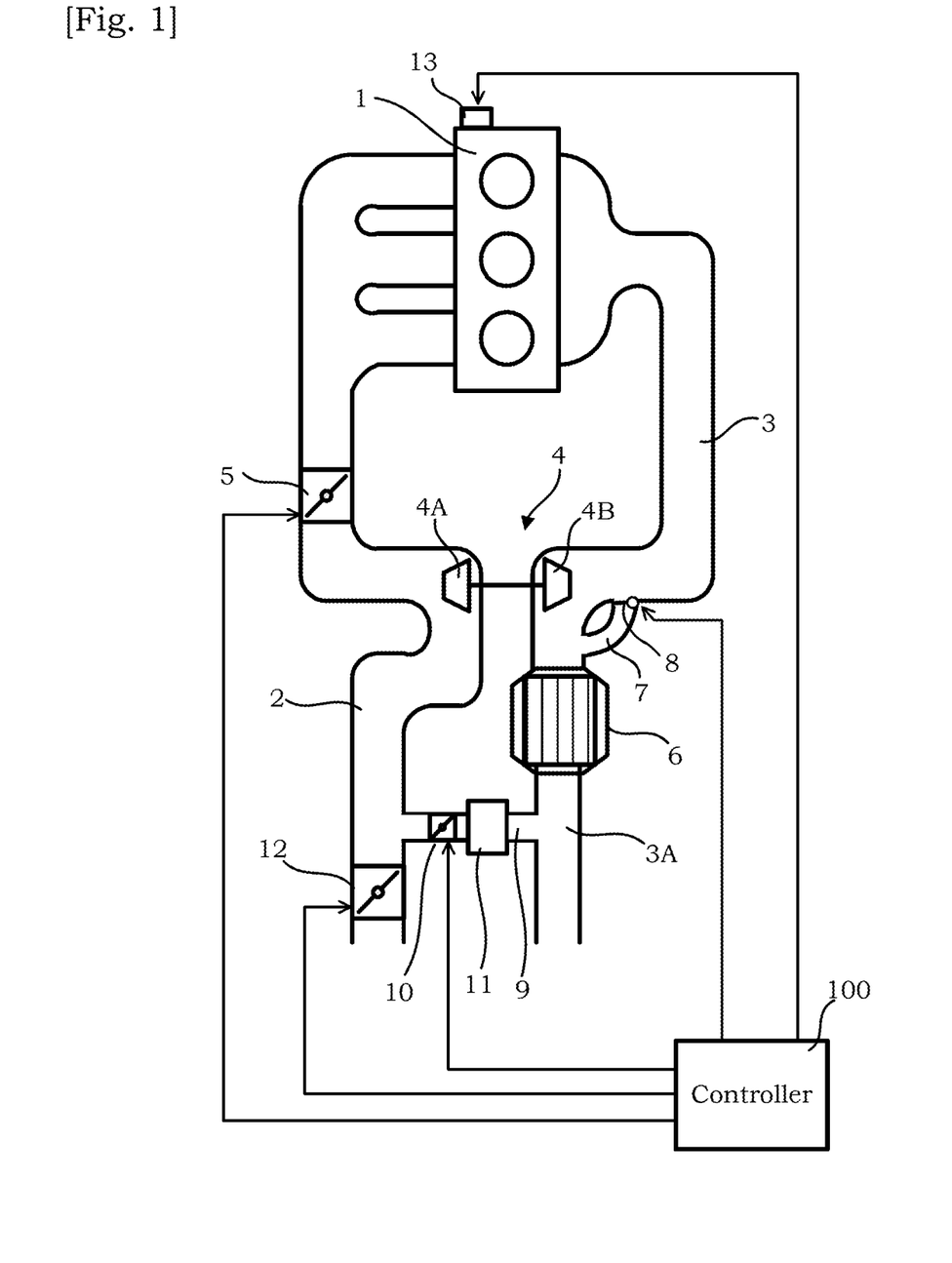
FIG. 1 is a schematic diagram of an internal combustion engine system.

FIG. 1 is a schematic diagram of a system employing the present embodiment.

An intake passage 2 of an internal combustion engine 1 disposes, in order from an upstream side of an intake flow, a differential pressure generating valve 12, a compressor 4A of a turbo supercharger 4, and a throttle valve 5 for adjusting an engine load. The differential pressure generating valve 12 and the throttle valve 5 are valves that open and close by an electric motor, and are controlled by a controller 100 later described. FIG. 1 shows butterfly valves as the differential pressure generating valve 12 and the throttle valve 5, however this may also be other types of valves.

An exhaust passage 3 of the internal combustion engine 1 disposes, in order from an upstream side of an exhaust flow, a turbine 4B of the turbo supercharger 4, and an exhaust gas purifying catalyst 6. The exhaust gas purifying catalyst 6 is, for example, a three-way catalyst.

The internal combustion engine 1 includes a bypass passage 7 that communicates a part of the exhaust passage 3 upstream of the turbine 4B with a part of the exhaust passage 3 downstream of the turbine 4B. The bypass passage 7 disposes a wastegate valve 8 that opens and closes the bypass passage 7. The wastegate valve 8 is a valve that opens and closes by an electric motor, and is controlled by the controller 100 later described. When the wastegate valve 8 opens, a part of exhaust gas flows by bypassing the turbine 4B. Therefore, by controlling the opening of the wastegate valve 8, boost pressure can be adjusted. Namely, in an operating region in which the throttle valve 5 cannot control the amount of the intake air due to the boost pressure exceeding air pressure, the engine load will be controlled by the wastegate valve 8.

FIG. 1 shows a swing valve as the wastegate valve 8, however this may be other types of valves.

Moreover, the system includes an EGR device for recirculating a portion of the exhaust gas into the intake passage 2. Hereinafter, the exhaust gas to be recirculated will be called EGR gas.

The EGR device is configured including an EGR passage 9 that communicates the exhaust passage 3A at a part downstream of the exhaust gas purifying catalyst 6 with the intake passage 2 at a part upstream of the compressor 4A, an EGR valve 10 that opens and closes the EGR passage 9, and an EGR cooler 11 that cools the exhaust gas passing through the EGR passage 9. Namely, the EGR device is what is called a low-pressure loop EGR device. The EGR valve 10 is a valve that opens and closes by an electric motor, and is controlled by the controller 100 later described. FIG. 1 shows a case of a butterfly valve serving as the EGR valve 10, however this may be other types of valves. The EGR cooler 11 may be any of either an air-cooled or a liquid-cooled type.

The internal combustion engine 1 includes a valve timing control mechanism 13 for changing a valve timing of the intake valve and the exhaust valve. A publicly known mechanism can be employed for the valve timing control mechanism 13; for example, a mechanism to change a rotational phase with respect to a crankshaft of an intake camshaft is used.

The controller 100 sets items such as a fuel injection amount, a fuel injection timing, an ignition timing, and an EGR ratio, on the basis of detected values from crank angle sensors, accelerator position sensors, intake pressure sensors, air flow meters, and like components not illustrated. Furthermore, on the basis of these, the controller 100 controls the opening and closing of the differential pressure generating valve 12, the throttle valve 5, the EGR valve 10, and the wastegate valve 8, and controls the valve timing by driving the valve timing control mechanism 13.

Next describes the exhaust gas recirculation control (hereinafter, also called EGR control).

Figure 2:
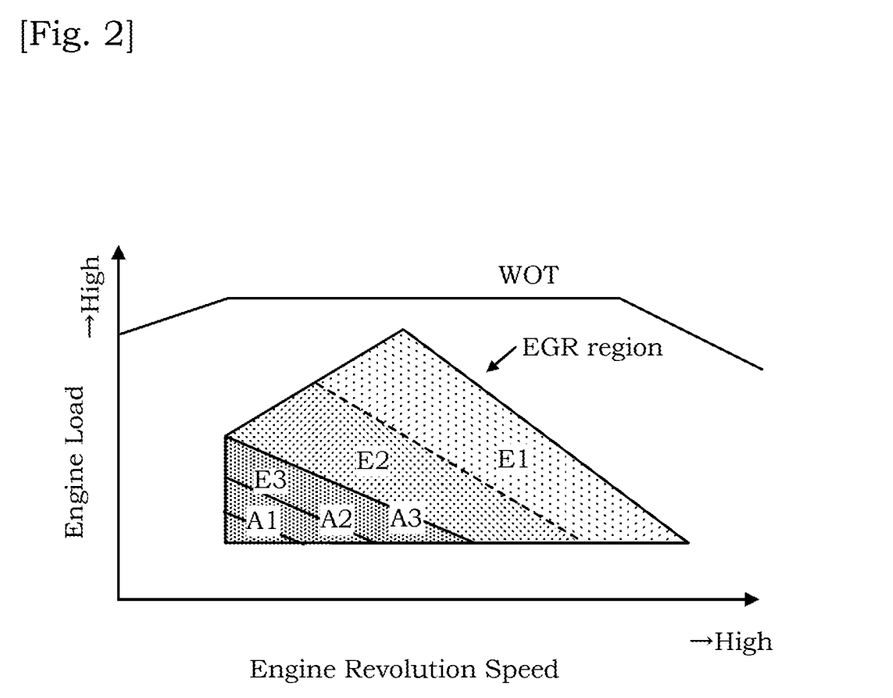
FIG. 2 is an EGR map showing EGR ratios for each operating region.

FIG. 2 is an EGR map showing the operating regions and EGR ratios that perform the EGR control. The horizontal axis in FIG. 2 represents engine revolution speed, and the vertical axis represents engine load. The EGR ratio is a proportion of EGR gas to fresh air gas The EGR region in FIG. 2 is a region in which EGR control is performed. The EGR region is divided into three regions, E1, E2, and E3, in accordance with the EGR ratio. The EGR ratio is set higher as the revolution speed and load becomes lower. For example, region E1 is 10%, region E2 is 1.5%, and region E3 is 20%.

Solid lines A1 to A3 of region E3 are even opening lines of the differential pressure generating valve 12. The opening of solid line A1 is defined as SA1, the opening of solid line A2 is defined as SA2, and the opening of solid line A3 is defined SA3. The sizes of the openings are SA1>SA2>SA3. In the low-pressure loop EGR device, parts of the intake passage 2 that are introduced with the EGR gas are mostly at air pressure; thus, the differential pressure between the intake side and the exhaust side of the EGR valve 10 (hereinafter, also called fore-and-aft differential pressure) is smaller than a conventional EGR device that introduces the EGR gas into a negative pressure part downstream of the throttle valve 5 (high-pressure loop EGR device). In particular, since the exhaust gas flow rate is low in the low revolution speed low load region and thus the pressure of the exhaust passage does not increase, the fore-and-aft differential pressure of the EGR valve 10 decreases. On this account, by controlling the differential pressure generating valve 12 largely in the closing direction as the air intake amount decreases, the pressure downstream of the differential pressure generating valve 12 is reduced to ensure the fore-and-aft differential pressure of the EGR valve 10.

The solid line A3 matches with an even fresh air amount line of an upper limit of a fresh air amount that receives no effect even when the differential pressure generating valve 3 is controlled to the closing side. In regions in which the intake air amount is small as like the low revolution speed low load region, although no effect is given on the fresh air amount even when controlling the differential pressure generating valve 12 to the closing side, if the intake air amount increases, pumping loss occurs in the differential pressure generating valve 12 and the fresh air amount decreases. On this account, in regions E2 and E1 where it exceeds the upper limit of the fresh air amount at which no effect is given by controlling the differential pressure generating valve 12 to the closing side, the differential pressure generating valve 12 is fully opened.

In regions E1 and E2, the differential pressure generating valve 12 is controlled to the fully opened state. This is because the pressure of the exhaust passage increases, and the fore-and-apt differential pressure of the EGR valve 10 develops sufficiently even when the differential pressure generating valve 12 is fully open.

The controller 100 reads in the engine revolution speed and the engine load as an engine operating state, and sets a target EGR ratio and a target opening of the differential pressure generating valve 12 by referring to the map of FIG. 2. The controller 100 then sets a target opening area of the EGR valve 10 on the basis of the target EGR ratio, and controls the opening to achieve that opening area. The engine revolution speed is calculated from a detected value of the crank angle sensor not illustrated. The engine load may be calculated from a detected value of the air flow meter not illustrated, or may be calculated from a detected value of the accelerator position sensor not illustrated.

Excluding a transient state later described in which the EGR ratio changes, the EGR ratio is controlled by the opening of the EGR valve 10. The differential pressure generating valve 12 generates an environment in which the EGR ratio changes in accordance with the opening of the EGR valve 10, and does not directly control the EGR ratio.

Figure 3:
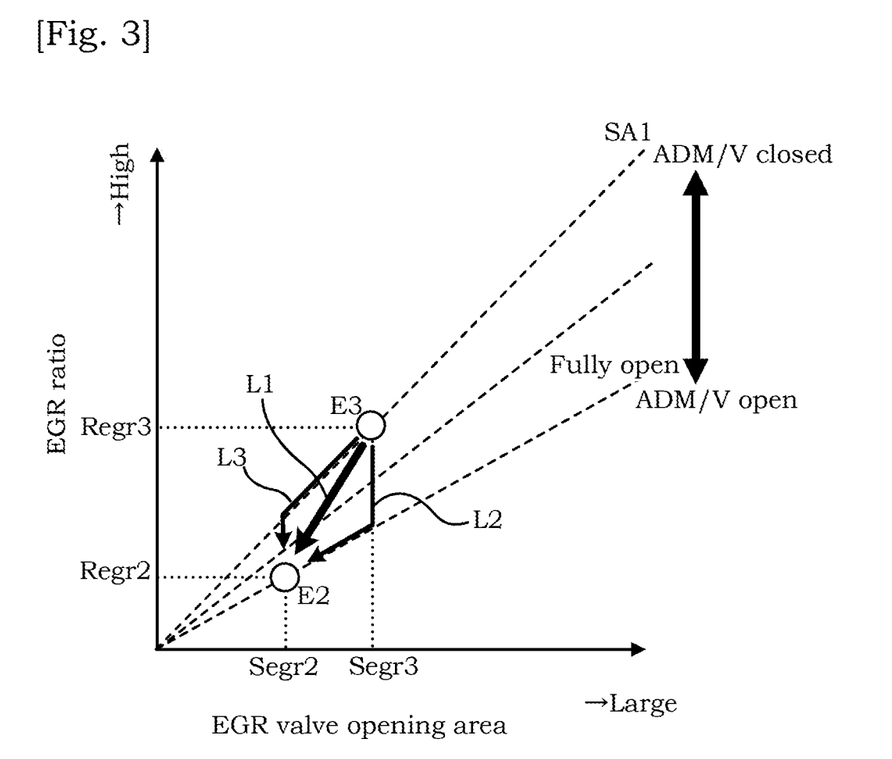
FIG. 3 is a view for describing a change history of the EGR ratio.

FIG. 3 is a view for describing a changing state of the EGR ratio in a case in which an operating point changes from on the solid line A1 of region E3 to region E2. The horizontal axis in FIG. 3 represents the opening area of the EGR valve (EGR/V) 10, and the vertical axis represents the EGR ratio. Moreover, the broken lines in FIG. 3 each show the opening of the differential pressure generating valve (ADM/V) 12.

When the operating point changes from region E3 to region E2, the EGR ratio changes from Regr3 to Regr2, the EGR/V opening area changes from Segr3 to Segr2, and the opening of the differential pressure generating valve 12 changes from SA1 to fully opened.

At this time, by operating the EGR valve 10 upon fully opening the differential pressure generating valve 12, a change history in the EGR ratio becomes as shown as L2 in FIG. 3. On the other hand, by operating the differential pressure generating valve 12 upon making the EGR/V opening area to Segr2, the change history in the EGR ratio becomes as shown as L3 in FIG. 3.

Either history includes a portion in which the EGR ratio sharply decreases. When the operating state changes the ignition timing will also change, however the ignition timing in the transition of change is set as generally assuming a change at a constant change rate from point E3 to point E2 in FIG. 3 (history L1 in FIG. 3). Therefore, if a change occurs including a part in which the EGR ratio sharply changes as like in history L2 and history L3, the combustion stability may deteriorate. For example, in history L2, the EGR ratio sharply decreases more than that of history L1 when the differential pressure generating valve 12 is made fully open, and a situation occurs that the actual EGR ratio is lower than what the assumed EGR ratio is. In this situation, if ignited on the basis of history L1, namely at an ignition timing set on the presumption that more EGR gas is introduced, knocking may occur. Moreover, in history L3, a situation occurs that the EGR ratio is higher than history L1 until the differential pressure generating valve 12 is fully opened. If ignited at the ignition timing set on the basis of history L1 in this situation, since more EGR gas is introduced than the assumed amount of EGR gas, the fire may extinct.

As described above, if the EGR ratio changes by history L2 and L3, the combustion stability may deteriorate. The same applies in a case in which the operating point changes from region E2 to region E3. Moreover, in a case of simultaneously starting operation of the differential pressure generating valve 12 and the EGR valve 10 independently, a sudden change in EGR ratio will similarly occur.

Accordingly, in the present embodiment, the EGR ratio is changed as in history L1 by the following control.

Figure 4:
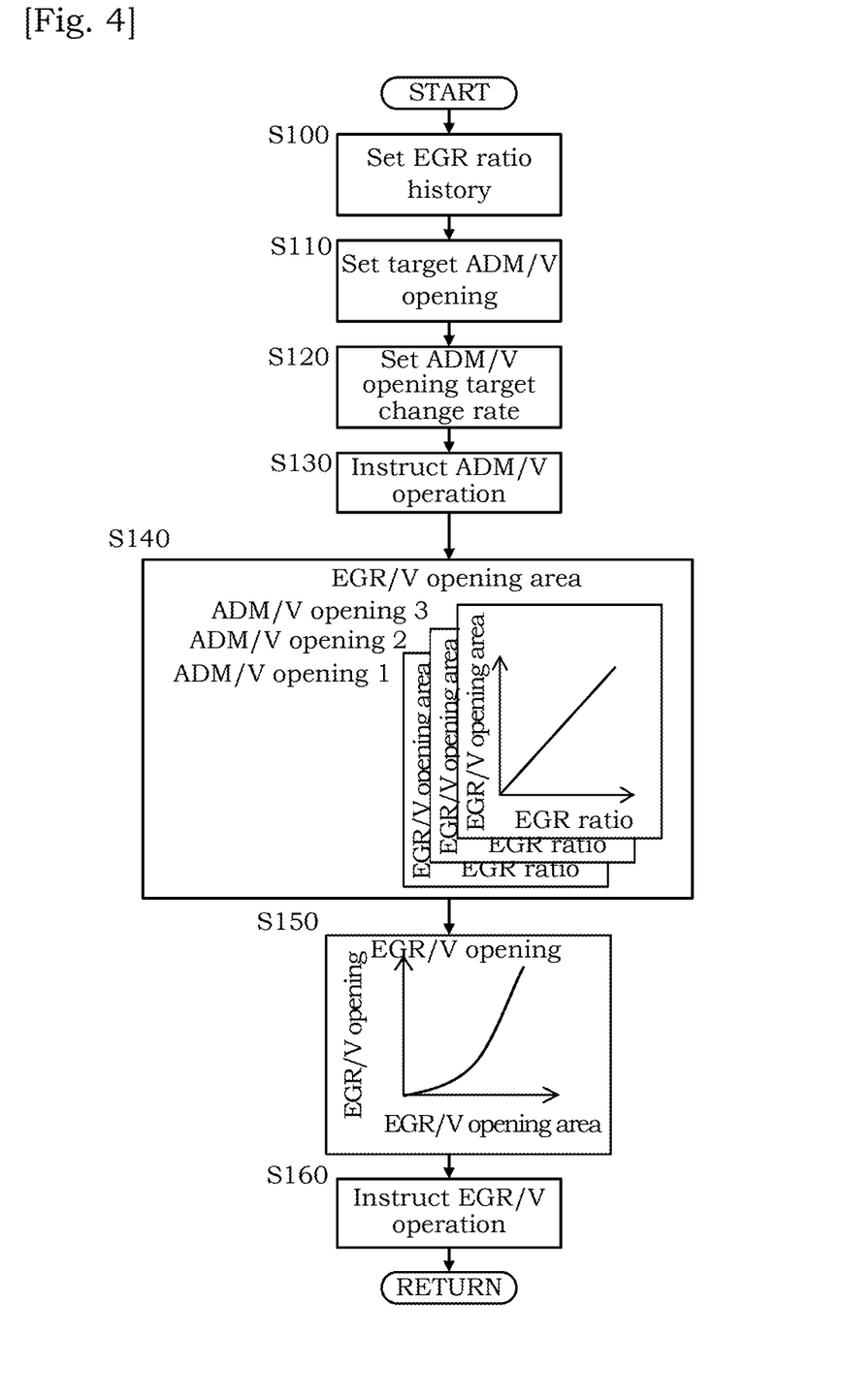
FIG. 4 is a flowchart showing an EGR control routine of First Embodiment.

FIG. 4 is a flowchart showing an EGR control routine performed by the controller 100 when the target EGR ratio changes. This control routine is repetitively performed in short intervals of, for example, around 10 milliseconds.

The present control routine cooperatively controls the differential pressure generating valve 12 and the EGR valve 10 so that the change history in the EGR ratio becomes the aforementioned L1. The following describes in line with the steps in the flowchart.

In step S100, the controller 100 sets the change history of the EGR ratio. Here, as in history L1 of FIG. 3, a history is set without a part in which the EGR ratio sharply changes.

In step S110, the controller 100 sets the target opening of the differential pressure generating valve 12 (target ADM/V opening) by searching the map shown in FIG. 2 with the engine revolution speed and the engine load. This target ADM/V opening is a target opening at the operating point after movement.

In step S120, the controller 100 sets a target value of an opening change rate from the current ADM/V opening to the target ADM/V opening (ADM/V opening target change rate). The ADM/V opening target change rate may be set to any value. The differential pressure generating valve 12 will not be largely moved to the closing side to prevent occurrence of pumping loss, and thus a change rate that immediately achieves the target value may be set.

In step S130, the controller 100 starts operating the differential pressure generating valve 12 on the basis of the ADM/V opening target change rate.

In step S140, the controller 100 sets the opening area of the EGR valve 10. Here, as shown, tables that set relationships of the EGR ratio with the opening area of the EGR valve 10 are created in advance for each opening of the differential pressure generating valve 12 and stored in the controller 100, and the opening of the EGR valve 10 is set by referring to the table at the EGR ratio determined from the EGR ratio history and the opening of the differential pressure generating valve 12. That is to say, in the present step, the opening area of the EGR valve 10 for making the EGR ratio in accordance with the EGR ratio history is set.

In step S150, the controller 100 sets the opening of the EGR valve 10 by searching the illustrated table with the opening area of the EGR valve 10 set in step S140. The table used here is one in which the relationship of the opening area of the EGR valve 10 with the opening of the EGR valve 10 is investigated and created in advance, and is stored in the controller 100.

In step S160, the controller 100 operates the EGR valve 10 on the basis of the opening of the EGR valve 10 set in step S150.

Figure 5:
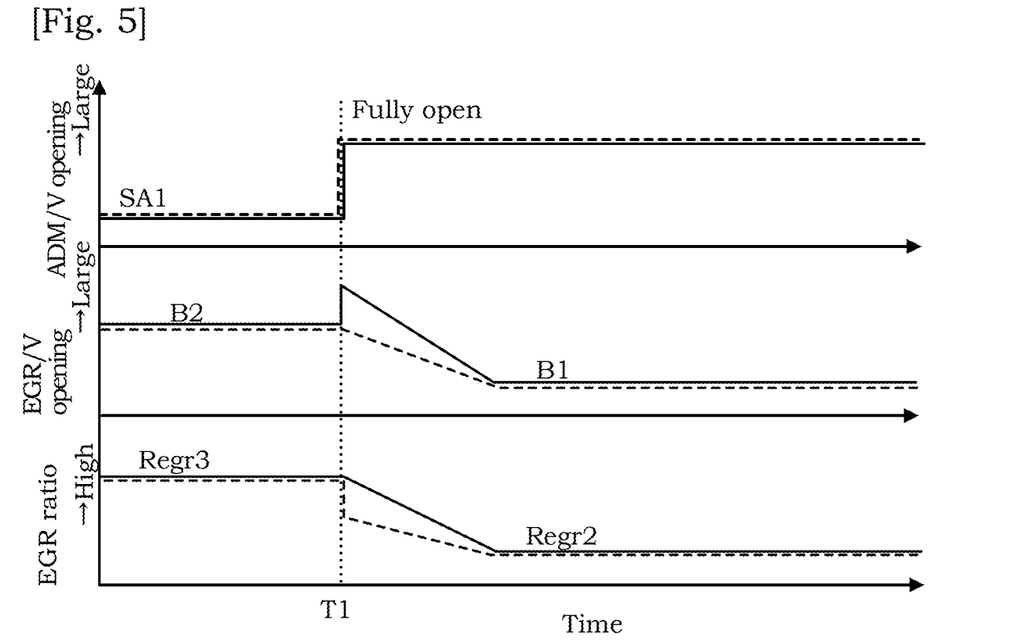
FIG. 5 is a timing chart of a case in which the EGR ratio is reduced in First Embodiment.

FIG. 5 is a timing chart in a case in which the control routine of FIG. 4 is performed at a transient state in which the operating point moves from region E3 to region E2 as with FIG. 3. The solid line in FIG. 5 shows a case in which the control routine is performed in the present embodiment. Moreover, FIG. 5 shows a case in which the differential pressure generating valve 12 and the EGR valve 10 each independently start operation simultaneously, as a comparative example with the broken line. Although the EGR valve 10 actually starts operation after the differential pressure generating valve 12 starts operation, the time difference is only slight, and hence in FIG. 5 it is shown as simultaneously starting the operation.

When the operating point targeted in timing T1 is switched to region E2, the EGR ratio history that changes at a constant change rate is set as shown, and the target ADM/V opening is set to fully opened (S100, S110). In the present embodiment, the controller 100 sets the ADM/V opening target change rate to one that makes the differential pressure generating valve 12 fully open step-wise at timing T1 (S120), and starts operating the differential pressure generating valve 12 (S130).

The opening of the EGR valve 10 increases immediately after starting the operation of the EGR valve 10, and then gradually decreases towards B2 (S140-S160). Immediately after starting the operation of the EGR valve 10, the EGR gas is made difficult to be introduced due to the differential pressure generating valve 12 being fully opened, and thus when the EGR valve 10 is caused to operate towards B2 together with the start of operation, the EGR ratio decreases sharply as in the comparative example. In comparison, in the present embodiment, the effect caused by the differential pressure generating valve 12 being made fully open is set off by increasing the opening of the EGR valve 10 immediately after starting the operation, and thus allows for changing the EGR ratio at the constant change rate.

Figure 6:
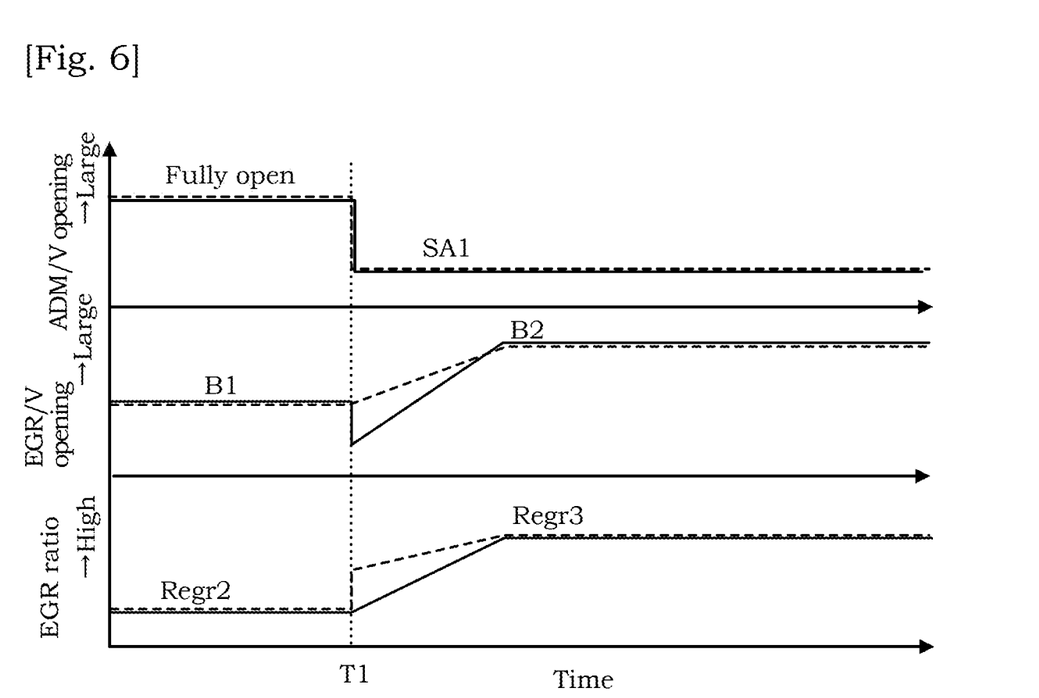
FIG. 6 is a timing chart of a case in which the EGR ratio is increased in First Embodiment.

FIG. 6 is a timing chart in a case in which the control routine of FIG. 4 is performed at a transient state in which the operating point moves from region E2 to region E3, opposite to FIG. 5. As with FIG. 5, the solid line shows the case in which the present embodiment is performed, and the broken line shows the comparative example.

When the operating point targeted at timing T1 is switched to region E3, the EGR ratio history that changes at the constant change rate is set as shown, and the target ADM/V opening is set to SA1 (S100, S110). In the present embodiment, the controller 100 sets the ADM/V opening target change rate that makes the differential pressure generating valve 12 become SA1 step-wise at timing T1 (S120), and starts operating the differential pressure generating valve 12 (S130).

The opening of the EGR valve 10 decreases immediately after starting the operation of the EGR valve 10, and then gradually increases (S140-S160). Immediately after starting the operation of the EGR valve 10, the EGR gas is made easily introduced clue to the opening of the differential pressure generating valve 12 becoming SA1, and thus when the EGR valve 10 is caused to operate towards 131 together with the start of operation, the EGR ratio increases sharply as in the comparative example. In comparison, in the present embodiment, the effect caused by the opening of the differential pressure generating valve 12 becoming small is set off by reducing the opening of the EGR valve 10 immediately after starting the operation, and thus can allow for changing the EGR ratio at the constant change rate.

In the EGR control described above, the EGR ratio history in which the EGR ratio changes at the constant change rate is set, however it is not limited to this. As long as the change rate is of a range in which no abnormal combustion of the internal combustion engine 1 such as knocking or extinction occur, the change rate can be changed in the middle.

As described above, in the present embodiment, the controller 100 cooperatively controls the opening of the EGR valve 10 (exhaust gas recirculation control valve) and the opening of the differential pressure generating valve 12, and causes the EGR ratio (exhaust gas recirculation ratio) to change to the target exhaust gas recirculation ratio at the change rate that prevents the abnormal combustion of the internal combustion engine 1. Accordingly, the sudden change in the EGR ratio can be prevented, and thus the EGR ratio can be changed without deteriorating the combustion stability.

In the present embodiment, in the case of reducing the EGR ratio, the controller 100 starts to operate the differential pressure generating valve 12 in the opening direction in advance, and operates the EGR valve 10 in the closing direction in accordance with the opening of the differential pressure generating valve 12 in operation. On the other hand, in the case of increasing the EGR ratio, the controller 100 starts to operate the differential pressure generating valve 12 in the closing direction in advance, and operates the EGR valve 10 in the opening direction in accordance with the opening of the differential pressure generating valve 12 in operation. As described above, by starting to operate the differential pressure generating valve 12 in advance and performing cooperative control that makes the EGR valve 10 operate in accordance with the opening of the differential pressure generating valve 12, it is possible prevent the sudden change in the EGR ratio.

Second Embodiment

The present embodiment is similar to First Embodiment in a point that at the transient state in which the EGR ratio changes, the sudden change in the EGR ratio is prevented by cooperatively controlling the differential pressure generating valve 12 and the EGR valve 10. However, the order that the differential pressure generating valve 12 and the EGR valve 10 are operated is different from First Embodiment. The following mainly explains the points different from First Embodiment.

Figure 7:
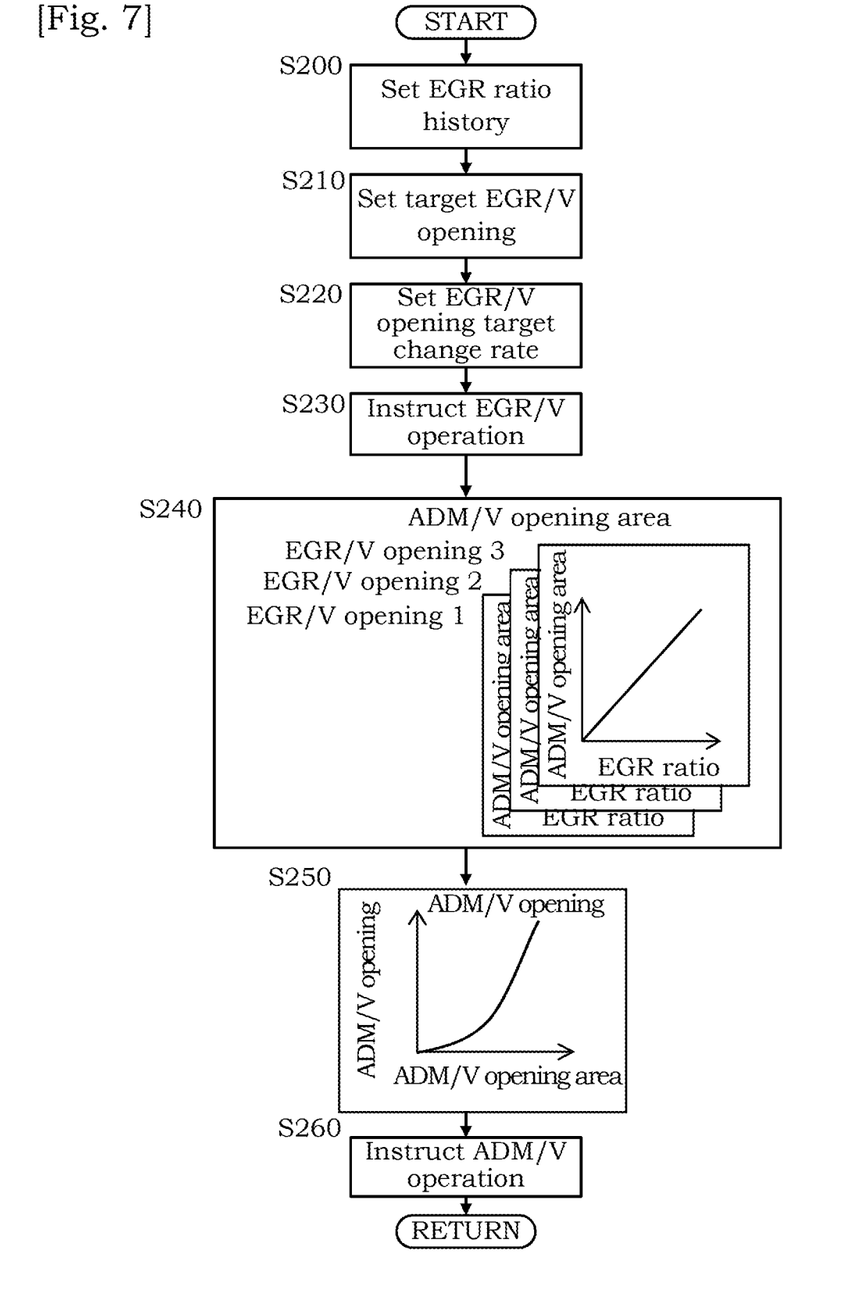
FIG. 7 is a flowchart showing the EGR control routine of Second Embodiment.

FIG. 7 is a flowchart showing the EGR control routine performed by the controller 100 of the present embodiment when the target EGR ratio changes. This control routine is repetitively performed in short intervals of, for example, around 10 milliseconds.

In step S200, the controller 100 sets the EGR ratio history. This step is the same as step S100 in FIG. 4, and thus explanation thereof is omitted.

In step S210, the controller 100 sets the target opening of the EGR valve 10 (target EGR/V opening) by searching the map shown in FIG. 2 with the engine revolution speed and the engine load. This target EGR/V opening is a target opening at the operating point after movement.

In step S220, the controller 100 sets a target value of an opening change rate from the current EGR/V opening to the target EGR/V opening (EGR opening target change rate). The EGR/V opening target change rate may be set to any value.

In step S230, the controller 100 starts operating the EGR valve 10 on the basis of the EGR/V opening target change rate.

In step S240, the controller 100 sets the opening area of the differential pressure generating valve 12. Here, as shown, tables that set a relationship of the EGR ratio with the opening area of the differential pressure generating valve 12 (ADM/V opening area) is created in advance for each opening of the EGR valve 10 and is stored in the controller 100, and the opening of the differential pressure generating valve 12 is set by referring to the table at the EGR ratio determined from the EGR ratio history and the opening of the EGR valve 10. That is to say, in the present step, the opening area of the differential pressure generating valve 12 for making the EGR ratio in accordance with the EGR ratio history is set.

In step 250, the controller 100 sets the opening of the differential pressure generating valve 12 by searching the illustrated table with the opening area of the differential pressure generating valve 12 set in step S240. The table used here is one in which the relationship of the opening area of the differential pressure generating valve 12 with the opening of the differential pressure generating valve 12 is investigated and created in advance, and is stored in the controller 100.

In step S260, the controller 100 operates the differential pressure generating valve 12 on the basis of the opening of the differential pressure generating valve 12 set in step S250.

Figure 8:
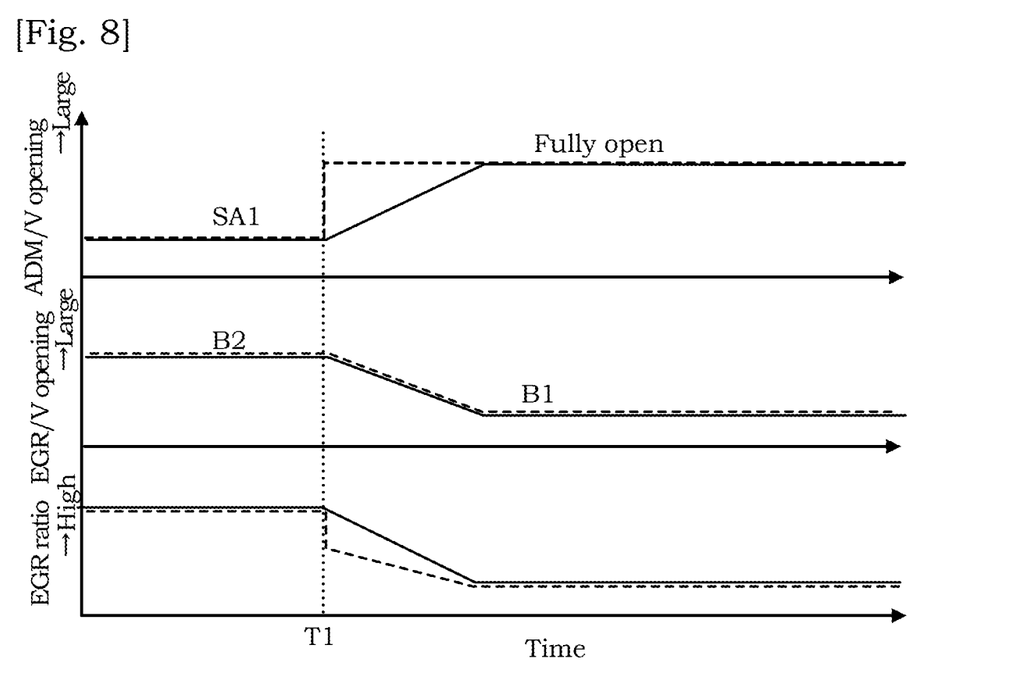
FIG. 8 is a timing chart of a case in which the EGR ratio is reduced in Second Embodiment.

FIG. 8 is a timing chart in a case in which the control routine of FIG. 7 is performed at the transient state in which the operating point moves from region E3 to region E2 as with FIG. 3. The solid line in FIG. 8 shows the case in which the control routine is performed in the present embodiment. Moreover, FIG. 8 shows the case in which the differential pressure generating valve 12 and the EGR valve 10 each independently start operation simultaneously, as the comparative example shown by the broken line. Although the differential pressure generating valve 12 actually starts operation after the EGR valve 10 starts operation, the time difference is only slight, and hence in FIG. 8 it is shown as simultaneously starting the operation.

When the operating point targeted at timing T1 is switched to region E2, the EGR ratio history that changes at the constant change rate is set as shown, and the target EGR/V opening is set to B (S200, S210). In the present embodiment, the controller 100 sets the EGR/V opening target change rate at which the opening of the EGR valve 10 decreases at a constant change rate (S220), and causes the EGR valve 10 to start operation (S230).

The opening of the differential pressure generating valve 12 increases gradually from immediately after starting the operation of the differential pressure generating valve 12 (S240-S260). If the differential pressure generating valve 12 is made fully open step-wise together with the start of the operation, the EGR ratio decreases sharply as in the comparative example. In comparison, in the present embodiment, the opening of the differential pressure generating valve 12 is gradually increased, and thus can prevent the sudden change of the EGR ratio.

Figure 9:
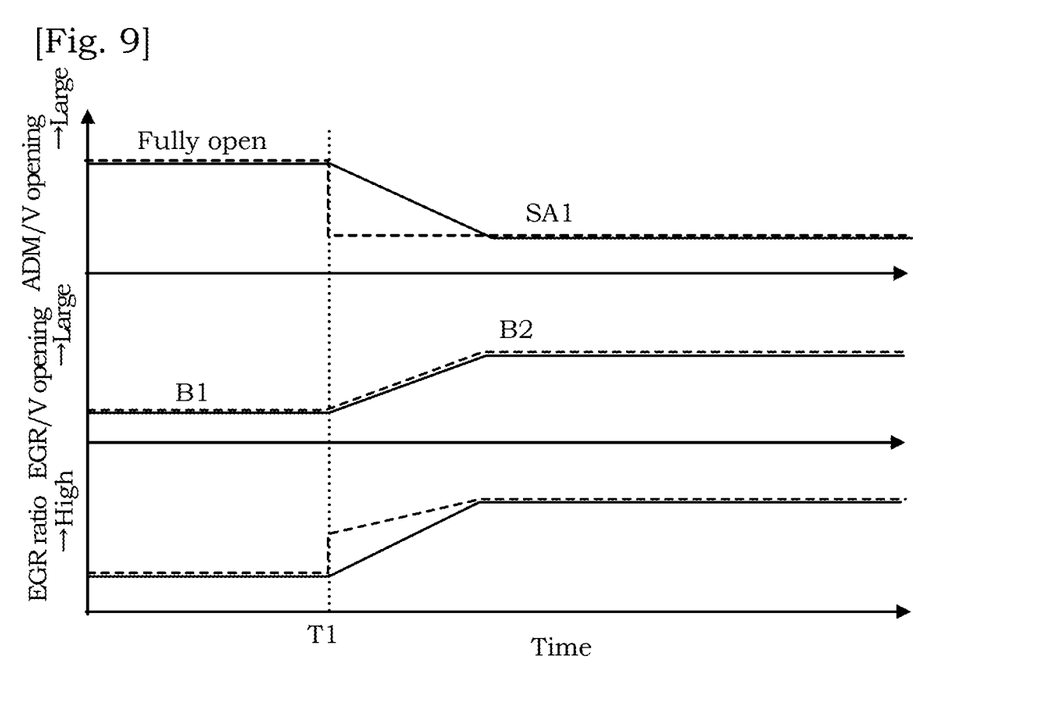
FIG. 9 is a timing chart of a case in which the EGR ratio is increased in Second Embodiment.

FIG. 9 is a timing chart in a case in which the control routine of FIG. 7 is performed at the transient state in which the operating point moves from region E2 to region E3, opposite to FIG. 8. As with FIG. 8, the solid line shows the case in which the present embodiment is performed, and the broken line shows the comparative example.

When the operating point targeted in timing T1 is switched to region E3, the EGR ratio history that changes at the constant change rate is set as shown, and the target EGR/V opening is set to B2 (S200, S210). In the present embodiment, the controller 100 sets the EGR/V opening target change rate at which the opening of the EGR valve 10 increases at the constant change rate as shown (S220), and makes the EGR valve 10 start the operation (S230).

The opening of the differential pressure generating valve 12 gradually decreases from immediately after starting the operation of the differential pressure generating valve 12 (S240-S260). If the differential pressure generating valve 12 is made to SA1 step-wise together with starting the operation, the EGR ratio increases sharply as in the comparative example. In comparison, in the present embodiment, the opening of the differential pressure generating valve 12 is reduced gradually, and thus the sudden change in the EGR ratio can be prevented.

As described above, in the present embodiment, in the case of reducing the EGR ratio, the controller 100 starts to operate the EGR valve 10 in the closing direction in advance, and operates the differential pressure generating valve 12 in the opening direction in accordance with the opening of the EGR valve 10 in operation. On the other hand, in the case of increasing the EGR ratio, the controller 100 starts to operate the EGR valve 10 in the opening direction in advance, and operates the differential pressure generating valve 12 in the closing direction in accordance with the opening of the EGR valve 10 in operation. As described above, by starting to operate the EGR valve 10 in advance and performing cooperative control that makes the differential pressure generating valve 12 operate in accordance with the opening of the EGR valve 10, it is possible prevent the sudden change in the EGR ratio.

Third Embodiment

The present embodiment is basically the same as First Embodiment, however a part of the EGR control routine differs. The following mainly describes the different points from First Embodiment.

Figure 10:
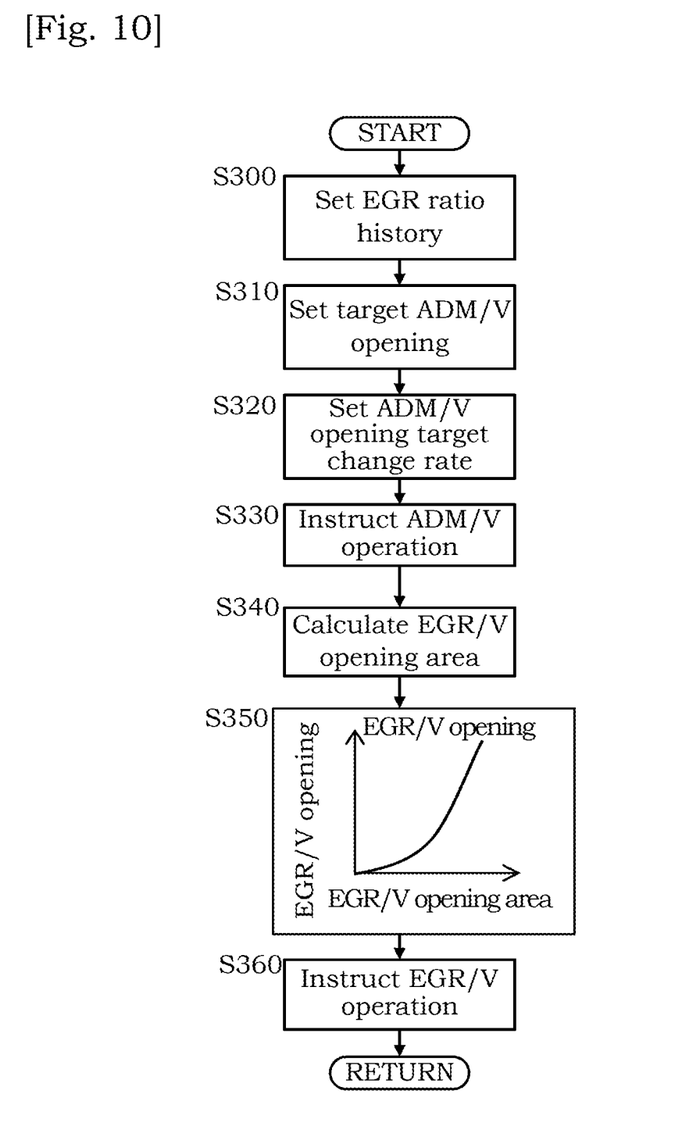
FIG. 10 is a flowchart showing the EGR control routine of Third Embodiment.

FIG. 10 is a flowchart showing the EGR control routine performed by the controller 100 of the present embodiment when the target EGR ratio changes. This control routine is repetitively performed in short intervals of, for example, around 10 milliseconds.

Steps S300 to S330, S350 to S360 are the same as steps S100 to S130, S150 to S160 in FIG. 4, and thus explanations thereof are omitted.

In step S340, the controller 100 calculates the opening area of the EGR valve 10 (EGR/V opening area) with Formula (1), and sets this.

$$\text{EGR}/V \text{ opening area} = \text{Basic EGR}/V \text{ opening area} \times f(\text{ADM}/V \text{ opening area}) \quad (1)$$

The basic EGR/V opening area of Formula (1) is an EGR/V opening area calculated from a relationship of the EGR/V opening area with the EGR ratio in a case of assuming the differential pressure generating valve 12 as any predetermined opening. The f (ADM/V opening area) in Formula (1) is a compensation item for compensating the basic EGR/V opening area in accordance with the opening of the differential pressure generating valve 12. Processes of the present steps are described with reference to FIG. 11.

Figure 11:
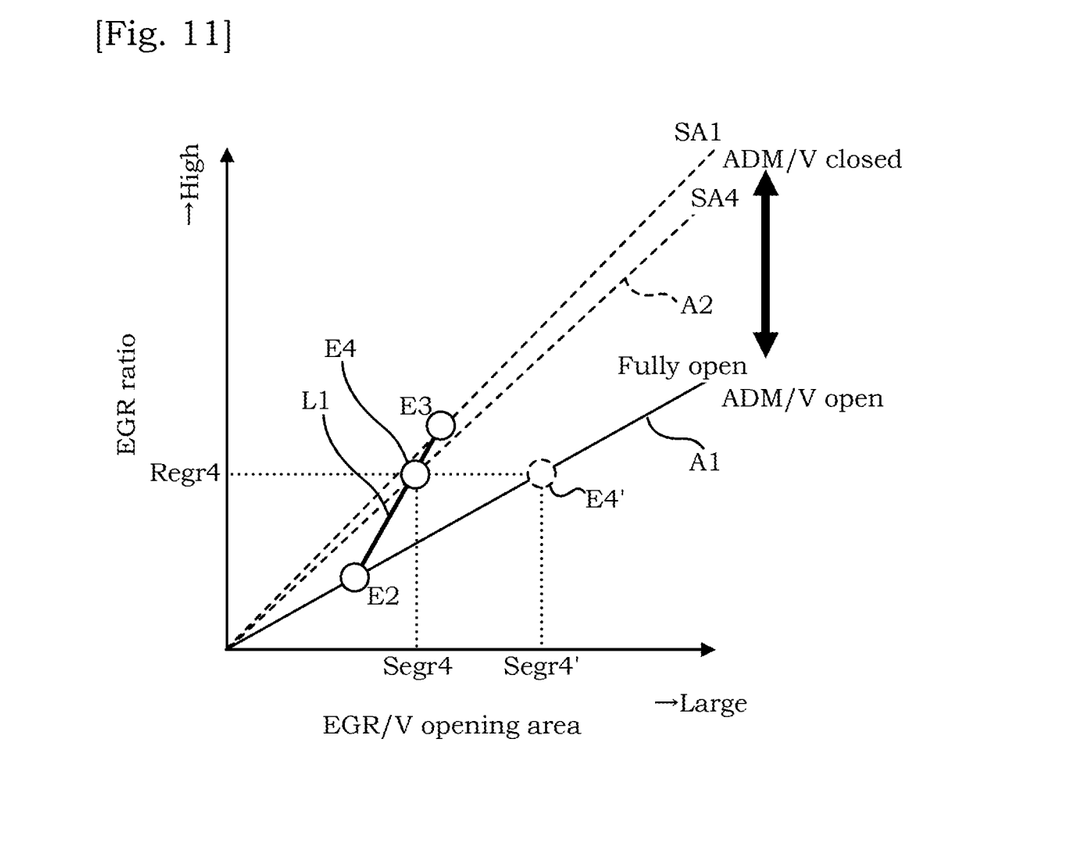
FIG. 11 is a view for describing a calculation method of an opening area of an EGR valve in Third Embodiment.

FIG. 11 is a view for describing a state of the EGR ratio changing in the case in which the operating point changes from on the solid line A1 of region E3 to region E2, as with FIG. 3. Here, the EGR/V opening area in a case of assuming that the predetermined opening of the differential pressure generating valve 12 is fully opened is made to serve as the basic EGR/V opening area. That is to say, the relationship between the EGR/V opening area with the EGR ratio is the straight line A1 shown by the solid line in FIG. 11, of when the differential pressure generating valve 12 is fully opened.

For example, when the EGR ratio calculated from the history L1 of the change in EGR ratio and the opening SA4 of the differential pressure generating valve 12 is Regr4, the basic EGR/V opening area becomes Segr4'. At this time, the actual opening of the differential pressure generating valve 12 is SA4, and thus the relationship of the EGR ratio with the EGR/V opening area should become the solid line A2. On this account, the basic EGR/V opening area is compensated with the above-mentioned compensation item in accordance with the difference in inclination between the solid line A1 and the solid line A2, to obtain the EGR/V opening area Segr4.

The predetermined opening of the differential pressure generating valve 12 at the time of setting the basic EGR/V opening area does not need to be fully opened.

Even by calculating the EGR/V opening area as described above, the same effect is obtained as with First Embodiment.

Fourth Embodiment

The present embodiment is basically the same as Second Embodiment, however a part of the EGR control routine differs. The following mainly describes the different points from Second Embodiment.

Figure 12:
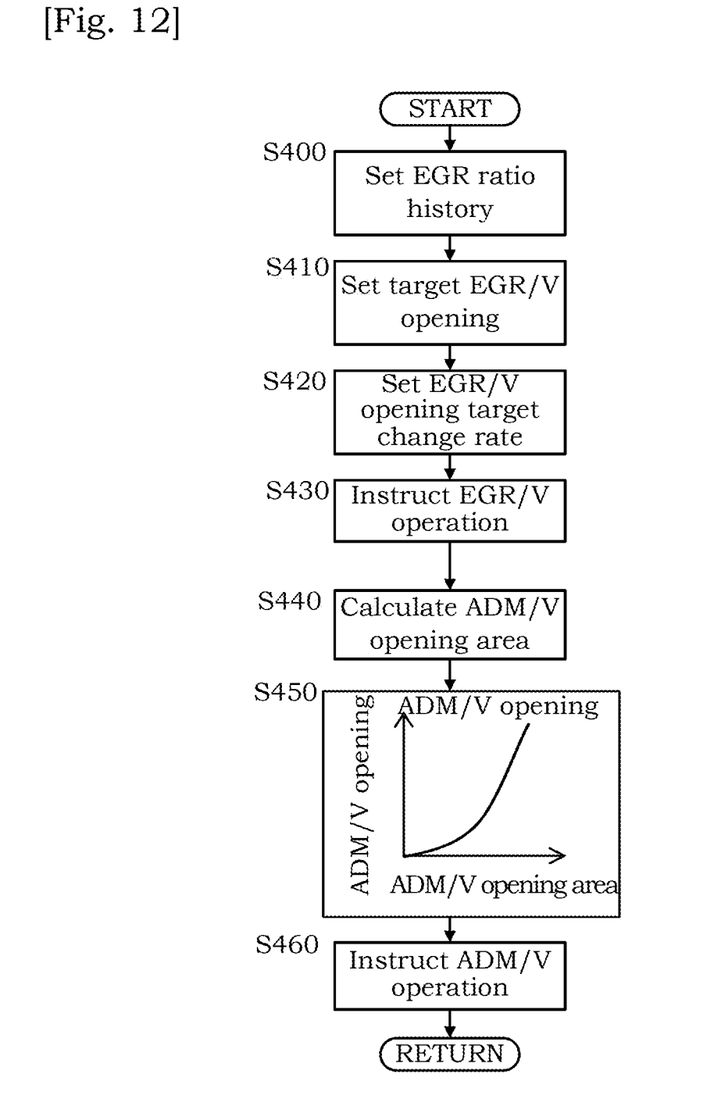
FIG. 12 is a flowchart showing the EGR control routine of Fourth Embodiment.

FIG. 12 is a flowchart showing the EGR control routine performed by the controller 100 of the present embodiment when the target EGR ratio changes. This control routine is repetitively performed in short intervals of, for example, around 10 milliseconds.

Steps S400 to S430, S450 to S460 are the same as steps S200 to S230, S250 to S260 in FIG. 7, and thus explanations thereof are omitted.

In step S440, the controller 100 calculates the opening area of the differential pressure generating valve 12 (ADM/V opening area) with Formula (2), and sets this.

$$ADM/V \text{ opening area} = \text{Basic } ADM/V \text{ opening area} \times f \text{ (EGR/}V \text{ opening area)} \quad (2)$$

The basic ADM/V opening area of Formula (2) is an ADM/V opening area calculated from a relationship of the ADM/V opening area with the EGR ratio in the case of assuming the EGR valve 10 as any predetermined opening. The f (EGR/V opening area) of Formula (2) is a compensation item for compensating the basic ADM/V opening area in accordance with the opening of the EGR valve 10. Processes of the present steps are described with reference to FIG. 13.

Figure 13:
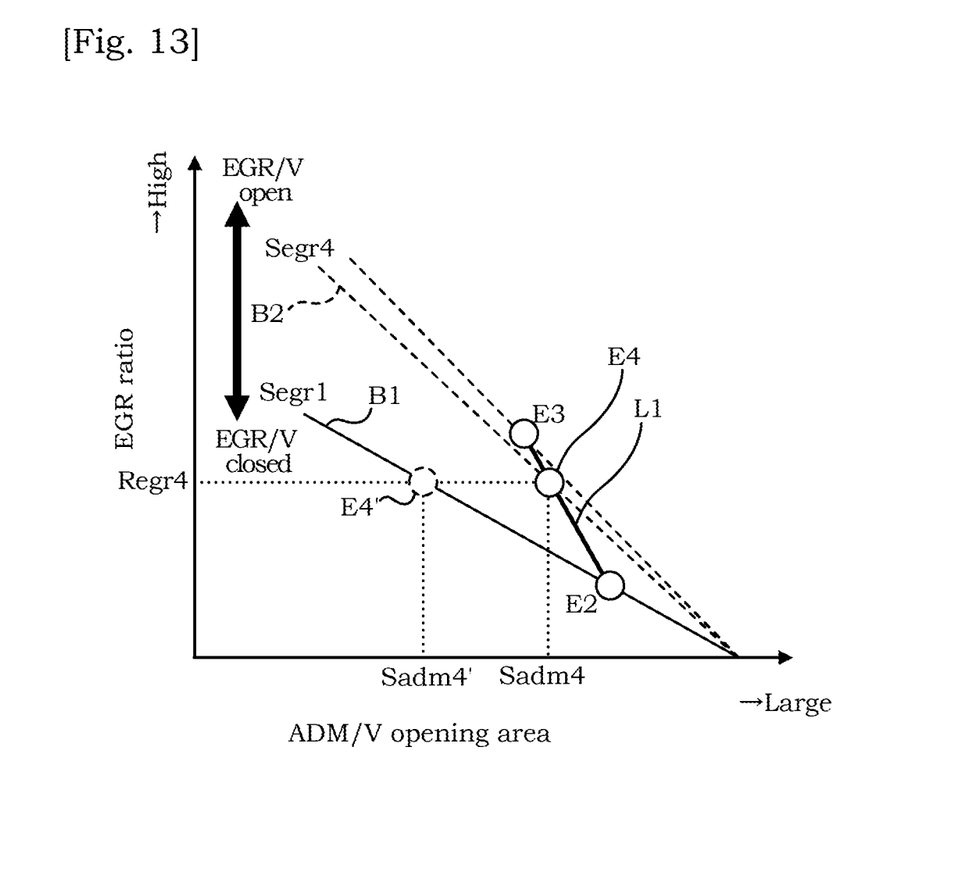
FIG. 13 is a view for describing a calculation method of the opening area of a differential pressure generating valve in Fourth Embodiment.

FIG. 13 is a view for describing a state of the EGR ratio changing in the case in which the operating point changes from on the solid line A1 of region E3 to region E2, as with FIG. 3. Here, the ADM/V opening area in a case of assuming the predetermined opening of the EGR valve 10 as Segr 1 is made to serve as the basic EGR/V opening area. That is to say, the relationship of the ADM/V opening area with the EGR ratio is the straight line B1 shown by the solid line in FIG. 13 of when the opening of the EGR valve 10 is Segr1.

For example, when the EGR ratio calculated from the history L1 of the change in EGR ratio and the opening Segr4 of the EGR valve 10 is Regr4, the basic ADM/V opening area is Sadm4'. At this time, the actual opening of the EGR valve 10 is Segr4, and thus the relationship of the EGR ratio with the ADM/V opening area should become the solid line B2. On this account, the basic ADM/V opening area is compensated with the above-mentioned compensation item in accordance with the difference in inclination between the solid line B1 and the solid line B2, to obtain the ADM/V opening area Segr4. The predetermined opening of the EGR valve 10 at the time of setting the basic ADM/V opening area may be set as any value.

Even by calculating the ADM/V opening area as described above, the same effect as with Second Embodiment is obtainable.

In the above Embodiments, the controller 100 has a configuration using the throttle valve 5 and the wastegate valve 8 to adjust the engine load, however it is not limited to this. For example, as long as the valve timing control mechanism 13 is of a configuration in which a valve lifted amount and the valve timing is variably controllable, the engine load can be adjusted with the valve timing control mechanism 13. The configuration capable of variably controlling the valve lifting amount and the valve timing is publicly known, and thus explanation thereof is omitted.

The engine load is adjusted by the throttle valve 5, the wastegate valve 8 or the valve timing control mechanism 13, and thus the change in the opening of the differential pressure generating valve 12 and the EGR valve 10 will give no effect on the engine load. Therefore, accelerating performance will not decrease by performing the EGR control routine of the aforementioned embodiments.

The embodiments of the present invention are described above, however the present embodiments merely show one portion of the applications of the present invention, and do not intend to limit the technical scope of the present invention to the specific configurations in the above embodiments.

The invention claimed is:

1. An exhaust gas recirculation control method for changing an exhaust gas recirculation ratio of an internal combustion engine, using an exhaust gas recirculation control device comprising:
   a turbo supercharger;
   an exhaust gas recirculation passage communicating an exhaust passage with an intake passage at a part upstream of a compressor of the turbo supercharger;
   an exhaust gas recirculation amount control valve disposed in the exhaust gas recirculation passage;
   a differential pressure generating valve disposed upstream of a merging portion of fresh air gas and exhaust gas in the intake passage; and
   a controller configured to control an opening of the exhaust gas recirculation amount control valve and an opening of the differential pressure generating valve,
   the exhaust gas recirculation control method comprising:
   setting an exhaust gas recirculation ratio change history from the current exhaust gas recirculation ratio to a target exhaust gas recirculation ratio,
   setting a target opening, which is an opening of one of the exhaust gas recirculation amount control valve or the differential pressure generating valve, when the exhaust gas recirculation ratio has changed to the target exhaust gas recirculation ratio, and a target value of an opening change rate from a current opening to the target opening,
   operating at least one of the exhaust gas recirculation amount control valve or the differential pressure generating valve based on the target value of the opening change rate; and
   operating the other of the exhaust gas recirculation amount control valve or the differential pressure generating valve based on the exhaust gas recirculation ratio determined from the exhaust gas recirculation ratio change history and the opening of the one of the exhaust gas recirculation amount control valve or the differential pressure generating valve in operation.

2. The exhaust gas recirculation control method according to claim 1, further comprising:
   starting, by the controller, operating the differential pressure generating valve in an opening direction in advance and operating, by the controller, the exhaust gas recirculation amount control valve in a closing direction in accordance with the opening of the differential pressure generating valve in operation, when reducing the exhaust gas recirculation ratio.

3. The exhaust gas recirculation control method according to claim 1, further comprising:
   starting, by the controller, operating the exhaust gas recirculation amount control valve in a closing direction in advance and operating, by the controller, the differential pressure generating valve in an opening direction in accordance with the opening of the exhaust gas recirculation amount control valve in operation, when reducing the exhaust gas recirculation ratio.

4. The exhaust gas recirculation control method according to claim 1, further comprising:
   starting, by the controller, operating the differential pressure generating valve in a closing direction in advance and operating, by the controller, the exhaust gas recirculation amount control valve in an opening direction in accordance with the opening of the differential pressure generating valve in operation, when increasing the exhaust gas recirculation ratio.

5. The exhaust gas recirculation control method according to claim 1, further comprising:
starting, by the controller, operating the exhaust gas recirculation amount control valve in an opening direction in advance and operating, by the controller, the differential pressure generating valve in a closing direction in accordance with the opening of the exhaust gas recirculation amount control valve in operation, when increasing the exhaust gas recirculation ratio.

6. The exhaust gas recirculation control method according to claim 1, wherein
the internal combustion engine comprises a throttle valve disposed downstream of the differential pressure generating valve in the intake passage, and
the method further comprises adjusting, by the controller, a load on the internal combustion engine by controlling an opening of the throttle valve.

7. The exhaust gas recirculation control method according to claim 6, further comprising:
opening and closing, by a wastegate valve of the internal combustion engine, a bypass passage that bypasses a turbine of the turbo supercharger, and
adjusting, by the controller, the load on the internal combustion engine by controlling the wastegate valve.

8. The exhaust gas recirculation control method according to claim 7, further comprising:
changing, by a valve timing control mechanism of the internal combustion engine, a valve timing and a valve lifted amount, and
adjusting, by the controller, the load on the internal combustion engine by controlling the valve timing control mechanism to change the valve timing and the valve lifted amount.

9. An exhaust gas recirculation control device of an internal combustion engine for changing an exhaust gas recirculation ratio, the exhaust gas recirculation control device comprising:

a turbo supercharger;
an exhaust gas recirculation passage communicating an exhaust passage with an intake passage at a part upstream of a compressor of the turbo supercharger;
an exhaust gas recirculation amount control valve disposed in the exhaust gas recirculation passage;
a differential pressure generating valve disposed upstream of a merging portion of fresh air gas and exhaust gas in the intake passage; and
a controller configured to control an opening of the exhaust gas recirculation amount control valve and an opening of the differential pressure generating valve,
wherein the controller is configured to:
set an exhaust gas recirculation ratio change history from the current exhaust gas recirculation ratio to a target exhaust gas recirculation ratio,
set a target opening, which is an opening of one of the exhaust gas recirculation amount control valve or the differential pressure generating valve, when the exhaust gas recirculation ratio has changed to the target exhaust gas recirculation ratio, and a target value of an opening change rate from a current opening to the target opening,
operate at least one of the exhaust gas recirculation amount control valve or the differential pressure generating valve based on the target value of the opening change rate; and
operate the other of the exhaust gas recirculation amount control valve or the differential pressure generating valve based on the exhaust gas recirculation ratio determined from the exhaust gas recirculation ratio change history and the opening of the one of the exhaust gas recirculation amount control valve or the differential pressure generating valve in operation.

* * * * *